US012664968B2

(12) United States Patent
Candelore et al.

(10) Patent No.: US 12,664,968 B2
(45) Date of Patent: Jun. 23, 2026

(54) SELECTIVE DISABLEMENT OF NOISE CANCELATION FOR CONVERSATIONS

(71) Applicant: Sony Group Corporation, Tokyo (JP)

(72) Inventors: Brant L. Candelore, Poway, CA (US);
James R. Milne, Ramona, CA (US);
Justin Kenefick, San Diego, CA (US);
William Clay, San Diego, CA (US)

(73) Assignee: SONY GROUP CORPORATION,
Tokyo (JP)

( * ) Notice: Subject to any disclaimer, the term of this
patent is extended or adjusted under 35
U.S.C. 154(b) by 160 days.

(21) Appl. No.: 18/404,790

(22) Filed: Jan. 4, 2024

(65) Prior Publication Data

US 2025/0225973 A1     Jul. 10, 2025

(51) Int. Cl.
*G10K 11/178* (2006.01)
*G10L 17/02* (2013.01)
*G10L 17/06* (2013.01)

(52) U.S. Cl.
CPC .. *G10K 11/17837* (2018.01); *G10K 11/17827*
(2018.01); *G10K 11/17885* (2018.01); *G10L*
*17/02* (2013.01); *G10L 17/06* (2013.01); *G10K*
*2210/1081* (2013.01); *G10K 2210/3016*
(2013.01); *G10K 2210/3036* (2013.01)

(58) Field of Classification Search
CPC ........... G10K 11/178; G10K 11/17823; G10K
11/17827; G10K 11/17837; G10K
11/17873; G10K 11/17885; G10K
2210/1081; G10K 2210/3016; G10K
2210/30231; G10K 2210/3036; G10K
11/175; G10L 17/00; G10L 17/02; G10L
17/06; G10L 21/0208; G10L 15/22; H04R 1/1083; H04R 5/033; H04R 5/04; H04R
25/505; H04R 25/552; H04R 2225/43;
H04R 2410/05; H04R 2420/01; H04R
2460/01; H04R 1/1041; H04R 25/407;
H04R 25/70; H04R 25/405; H04R
25/507; G06F 3/16; G06F 3/165; G06F
3/167; H04S 1/007
USPC ........ 381/71.1, 71.6, 71.7, 71.8, 71.9, 71.11,
381/71.12, 72, 73.1, 74, 312, 313, 317,
381/320, 321, 122, 123; 704/1–9,
704/500–504; 700/94
See application file for complete search history.

(56) References Cited

U.S. PATENT DOCUMENTS

| | | | | |
|---|---|---|---|---|
| 2014/0122077 A1* | 5/2014 | Nishikawa | .............. | G10L 17/04 |
| | | | | 901/46 |
| 2015/0170645 A1* | 6/2015 | Di Censo | ......... | G10K 11/17821 |
| | | | | 704/275 |

(Continued)

FOREIGN PATENT DOCUMENTS

EP          4171060 A1     4/2023

*Primary Examiner* — Leshui Zhang
(74) *Attorney, Agent, or Firm* — Trellis IP Law Group,
PC

(57)          ABSTRACT

A noise canceling disablement system is provided to enables
a user to hear select conversational speech directed at the
user while wearing a noise cancelling hearable device. The
disablement system automatically at least partial disables the
noise canceling feature of the hearable device in response to
recognizing conversational speech of a speaking person
within a detected conversation zone of the user. In some
cases, triggering of the noise canceling disablement further
requires the speaking person to be identified by the system
as significant person of the user.

16 Claims, 6 Drawing Sheets

(56) References Cited

U.S. PATENT DOCUMENTS

| | | | |
|---|---|---|---|
| 2018/0158462 A1* | 6/2018 | Page | G10L 17/00 |
| 2020/0135163 A1* | 4/2020 | Lovitt | G10K 11/17827 |
| 2022/0005450 A1 | 1/2022 | Tachi | |

* cited by examiner

100

300

400

500

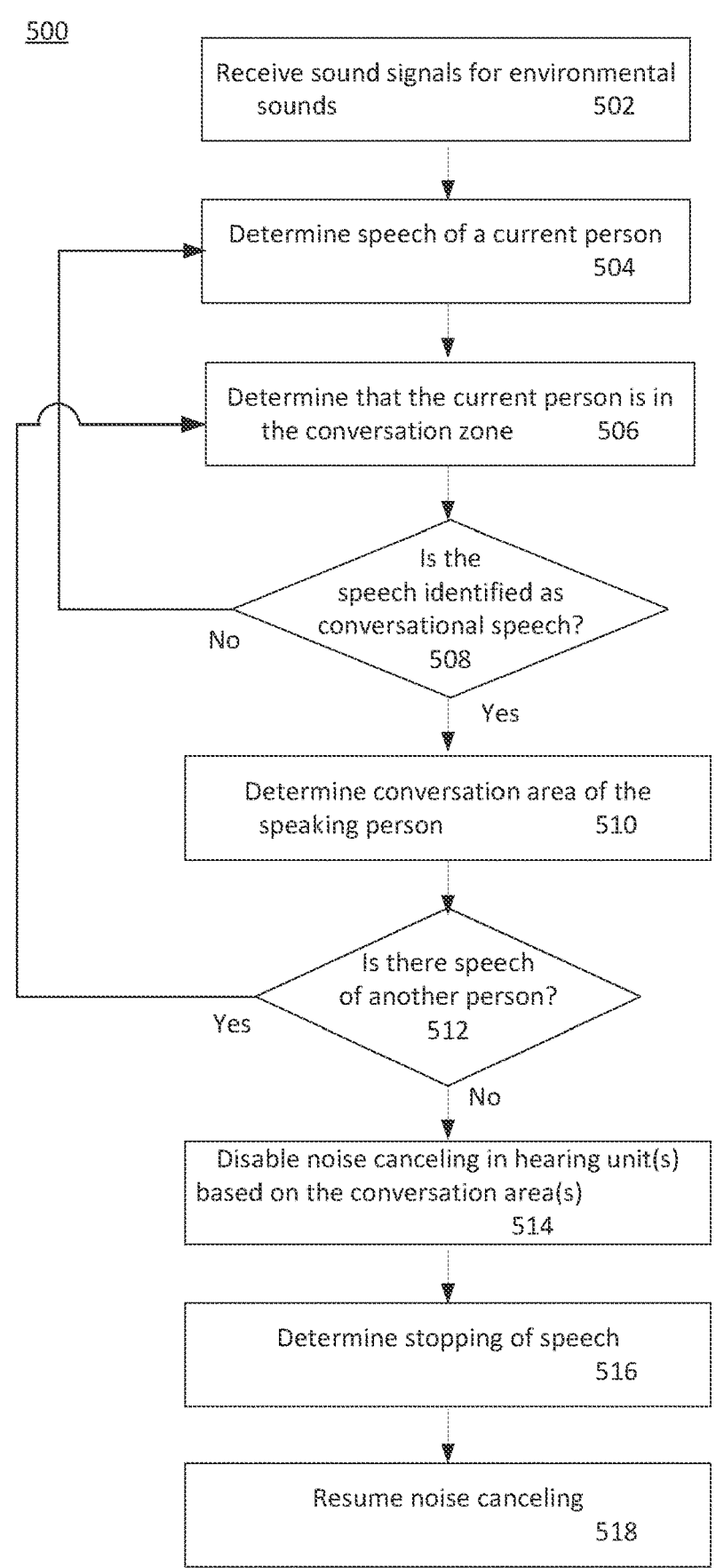

Receive sound signals for environmental sounds    502

Determine speech of a current person    504

Determine that the current person is in the conversation zone    506

Is the speech identified as conversational speech?    508

No

Yes

Determine conversation area of the speaking person    510

Is there speech of another person?    512

Yes

No

Disable noise canceling in hearing unit(s) based on the conversation area(s)    514

Determine stopping of speech    516

Resume noise canceling    518

FIG. 5

SELECTIVE DISABLEMENT OF NOISE CANCELATION FOR CONVERSATIONS

BACKGROUND

Hearable devices (also called "hearables") include a variety of ear worn devices to alter hearing of the user, such as for playing audio close to or into the ear (e.g., headphones, earbuds), blocking from hearing environmental audio (e.g., noise canceling), assisting with hearing of environmental audio (e.g., hearing aids), etc. In particular, noise canceling features can block environmental sounds from being heard by the user. Some noise cancelation technology uses active type functionality by erasing lower frequency sound waves. Active noise cancelation typically employs circuitry that senses microphone input to determine wave frequency/amplitude and creates a new wave out of phase with the noise waves.

A noise canceling feature can enable a user to focus attention onto other tasks, such as listening to audio played through the hearable, sleeping, performing concentration requiring activities, like reading or writing, etc. Noise canceling technology has become so effective in recent times that virtually all sound may be prevented from being heard by the user. However, at times certain environmental noises may be desirable for the user to hear, while other noises may be ignorable by the user. For example, it is often beneficial to remove noise canceling when another person converses with the user.

SUMMARY

A noise canceling disablement system (also called "disablement system" or "system") is provided that enables at least partial disabling of a noise canceling feature of a hearable device in response to conversational speech by a person directed at the user of the hearable. The person speaking to the user is often located within an area close to the user, referred to a conversation zone. The system detects the vicinity of the person to be within the conversation zone to trigger the disablement of noise canceling. Additional factors may also be considered to determine disablement in some implementations, such as identification of the speaking person as being significant to the user.

A method is provided for adjusting a noise canceling feature of a hearable device of a user by selectively at least partially disabling the noise canceling feature. The method includes receiving sound signals for at least one sound detected from an environment of the user by one or more microphones of the hearable device during an interaction period of the user with a speaking person. It is determined that the sound includes a first speech by the speaking person. The first speech is identified as first conversational speech that is directed to the user by certain step(s). A first vicinity of the first person determined to be within a conversation zone of the user can be used to identify the first speech as first conversational speech directed to the user. In response to the identification of the first conversational speech, the noise canceling feature of the hearable device is at least partially disabled.

In some aspects of the method, the first speech may be identified as first conversational speech by also identifying that the first person is a significant person based on analyzing the first speech. For example, using speech recognition of the first speech may be employed to compare the first speech to stored speech of one or more significant persons. In some implementations, prior to determining the first conversational speech, sample speech of the significant person may be recorded, during the interaction period with the significant person. The sample speech may be stored to use as the stored speech in comparison to the first speech.

In still some implementations, the vicinity of the first person may be determined by detecting a first conversation area of the first person, wherein the first conversation area is at a left side area, a right side area, or a front area of the user in the conversation zone. Where the first conversation area is detected to be at the left side area, the noise canceling feature of a left hearing unit of the hearable device may be disabled and the noise canceling feature of a right hearing unit may be maintained. For a first conversation area found to be at the right side area, the noise canceling feature of the right hearing unit may be disabled and the noise canceling feature of the left hearing unit may be maintained. At other times, for the first conversation area detected at the front area, the noise canceling feature of both the left hearing unit and the right hearing unit may be disabled.

In some implementations, it may be detected that the at least one sound includes a second speech of a second person. In such situations, a second vicinity of the second person may be detected within the conversation zone at a second conversation area that is different than the first conversation area. The noise canceling feature of at least one of the right hearing unit and left hearing unit may be disabled to correlate with the second conversation area.

In some implementations of the disablement method, a stopping of conversation may be detected to end the interaction period of the user with the speaking person. In response to detecting the stopping of the conversation, the noise canceling feature of the hearable device may resume.

In some implementations, an apparatus of the noise canceling disablement system is provided, which is configured for adjusting a noise canceling feature of a hearable device of a user. The hearable device includes a noise canceling feature. The apparatus also includes one or more processors and logic encoded in one or more non-transitory media for execution by the one or more processors. When the logic is executed, the logic is operable to perform various operations as described above in terms of the method. The operations include at least some of the methods described above.

In some implementations, a non-transitory computer-readable storage medium is provided which carries program instructions for adjusting a noise canceling feature of a hearable device of a user. These instructions when executed by one or more processors cause the one or more processors to perform operations as described above for the noise canceling disablement method described above.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

FIG. 5 is a flow diagram of various example method to disable (at least partially) a noise canceling feature of a hearable device of a user for potential multiple persons in a conversation with the user and for a multi-tasking mode, in accordance with some implementations.

DETAILED DESCRIPTION OF EMBODIMENTS

Figure 1:
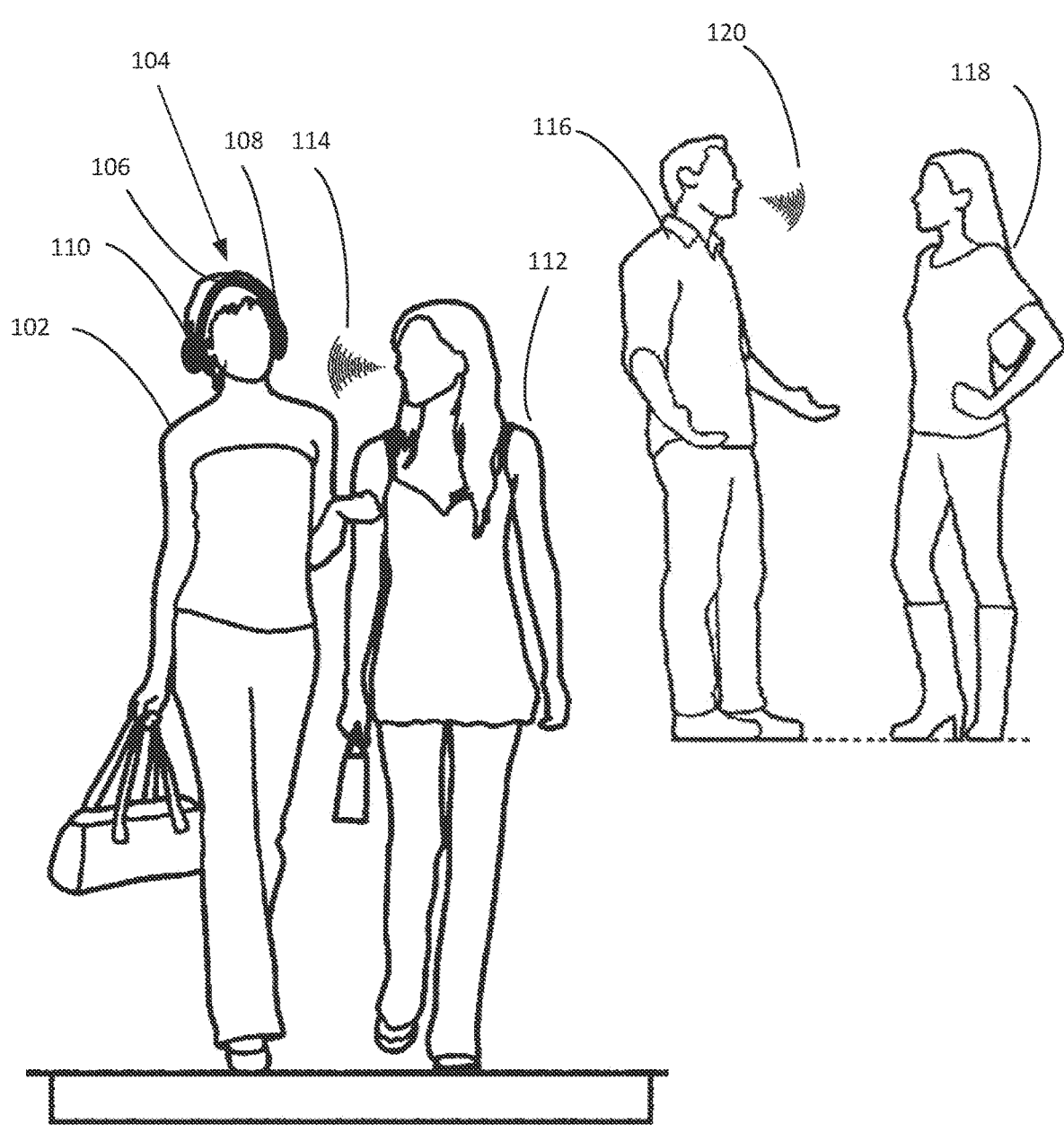
FIG. 1 is a conceptual diagram illustrating an example setting in which various aspects of the noise canceling disablement system can be implemented, in accordance with some implementations.

The present noise canceling disablement system enables automatic at least partial disabling of a noise canceling feature of a hearable device in response to conversational speech by a person directed at the user of the hearable device, in which such triggering conversational speech is by other persons rather than the user speaking. The present disablement function does not require the user to manually activate the disablement of noise canceling, or to remove the hearable unit(s) from the ear(s) of the user. The system detects a vicinity of the person relative to the user within a defined conversation zone to trigger disablement of noise canceling.

The conversation zone is an area around the user that has potential for a speaking person to be located when directing conversation to the user. The conversation zone further is proximal to the user such that the disablement system is capable of distinguishing the conversational speech from other environmental noises. In some implementations, further factors may be considered in disabling noise canceling, which may include identification of the speaking person as being significant to the user.

Disablement of the noise canceling feature of a hearable device may involve full cancelation of all hearing units of the hearable device, such as completely turning off of the noise canceling of a left unit of the hearable directed to the left ear of the user and a right unit directed to a right ear of the user. In some implementations, the hearable may be automatically controlled for partial disablement of the noise canceling feature, such that some noise is blocked and some noise is allowed to be heard by the user. Partial disablement may include complete turning off of the noise canceling feature of a left unit or a right unit, but not both left and right units. In some implementations, partial disablement may also include reducing the level of the noise canceling feature such that the feature is turned low to allow the user to hear only loud noises, such as the speaking person proximal to the user, but block softer or background noises, such as noises farther away from the user.

The hearable employs the disablement system to adjust a noise canceling feature of the hearable. The hearable device of the disablement system can include a variety of types of selective hearing devices, such as earbuds, smart headphones, hearing aids, bone phones (bone conducting), and other ear directed devices configured to be worn (including insertable and implantable) that alter sounds heard by a user and include the noise canceling feature. Some hearables may function solely for noise canceling for a user to block environmental sounds. Other hearables may be multifunctional to allow for multiple sensory enhancements, such as audio listening devices that deliver audio content to the user, including smart headphones, smart earbuds, etc.

The hearable may include one hearing unit dedicated to one ear of the user, or may include a pair of hearing units (left and right) for a respective ear of the user. Processing circuitry and/or software components of a hearable device can capture, process, block, reduce, and/or amplify sounds that pass to the ear canal of the user. Other components of the hearable may be for securing the hearable in place when worn by the user, such as a band, cup, etc. Although specific examples of hearables are described, it should be understood that the noise canceling disablement system may also be applied to other hearable devices that include adjustable noise canceling features as described below.

The "user" of the hearing aid focusing system as applied in this description, refers to a person who uses a hearable that employs the noise canceling disablement system. The user employs the disablement system during an interaction period when in a conversation with one or more speaking persons physically locating in the near environmental setting of the user. A speaking person refers to a person other than the user who is directing talk to the user.

The interaction period may begin at a time that a conversation is expected to commence or has commenced and end at a stopping point when it is determined that the conversation has ceased. The initiation of the interaction period may occur upon various initiation triggers. For example, initiation may be manually controlled by the user, such as via user input when the user is about to enter into a conversation, triggered by the user recording a snippet of speech of a present person, or initiated at a predesignated future time. The initiation may be also automatically triggered upon the disablement system detecting conversational speech by a person who is in the conversation zone of the user and/or detecting speech by an identified significant person.

A stopping point of the interaction period may be determined by the disablement system detecting that no speech has occurred by the speaking other person and/or the user for a predesignated period of time. A pause in the conversation may be considered a stopping of the conversation based on the rhythm of the conversation and how often the parties to the conversation naturally take a break between speaking. The stopping point may also be detected by the speaking person moving outside of the conversation zone. If the speaking person moves then back into the conversation zone with the user, the interaction period may recommence (e.g., without requiring reanalysis of a significant person) or a new interaction period may be initiated. In some implementations, stopping of the conversation may be detected by the disablement system detecting predesignated stopping word (s), such as "goodbye". "stop" or similar words/phrases.

A "conversation" as referred to herein may be two-sided to include speech by another person directed to the user and the user may also contribute by speaking to the person. But also, a "conversation" may be one-sided to include speech by the other person and the user does not speak to the person. At times, a conversation may include multiple other persons speaking sequentially or speaking at the same time in a group conversation.

Other noise canceling hearables that do not employ the present disablement system, may require the user to yank off at least one of the hearing units from the ear in order for the user to listen to a person talking to the user. For example, if a speaking person is on a left side of the user, the user may remove a left earbud or left earphone. The hearable or hearing unit may need to be stored while taken off or held away from the ear. In the case of earbuds, there is potential for the user to lose at least one of the earbud units in the process.

Other types of noise canceling systems may rely on detecting a user speaking to activate or deactivate noise canceling. An issue with user speech detecting systems may be when a user stops talking to listen to the other person, noise canceling may become reactivated. Also, for such other types of systems, situations in which the other person initiates a conversation, the speech may get lost until the user notices and speaks to the person (e.g., the user asks, "what did you just say?"). The present noise canceling disablement system circumvents such problems by detecting speech of the other person as a trigger to at least partially disablement of the noise canceling feature.

The present noise canceling disablement system addresses these problems with other systems and have additional benefits that will be apparent by this description.

FIG. 1 is an illustrative example of a use case of the noise canceling disablement system 104 employed by a user 102 in an environment 100 to enable the user 102 to hear conversational speech in the environment 100. The disablement system 104 includes hearable device 106 worn by user 102.

The hearable device 106 includes a left hearing unit 108 and right hearing unit 110 that cup over the respective ears of the user 102. Each hearing unit includes one or more microphones and a noise canceling feature to block sounds of the environment 100. At least one hearing unit and often each of a pair of hearing units include hardware and/or software to perform operations to selectively disable a noise canceling feature, such as operations described below with regard to FIGS. 4 and 5. For example, one or more hearing units may include a processor(s) and logic encoded in one or more non-transitory media for execution by processor(s) and when executed operable to perform the operations. At least some of the hardware and/or software may also be in other parts of the hearable device, such as a band connecting hearing units.

The illustration shows a headphone type hearable worn over both ears. Other hearable may be earbuds worn at one or both ears of a user, one or a pair of hearing aids, etc. The wearable may be inserted into the ear, implanted into the ear, worn over part of the head, such as a hat or band, etc. The hearable may also be a component of a wearable system including other devices, such as smart glasses, smart watch, etc.

In the example of FIG. 1, user 102 and speaking person 112 walk down a sidewalk while having a conversation. The person 112 speaks to the user 102. The speech 114 of person 112 is identified as conversational speech by the disablement system 104. One or more microphones of the hearable device 106 receive sound signals of the speech 114 and convert the sound signals into electronic signals. The disablement system determines by analysis of the electronic signals that the speaking person 112 is in a conversation zone of the user 102, as described by example below with regard to FIGS. 3 and 4. The proximal location of the speaking person 112 within a conversation zone of the user 102 is used to identify the speech 114 as conversational speech directed to the user. Specifically, the speaking person 112 is detected to be in a left side area of the user. Identification of the conversational speech triggers disablement of the noise cancelation.

In some implementations, triggering of the disablement system also requires identification of a speaking person as a significant person to the user. For example, person 112 may be identified as a significant person by analyzing the speech 114. The disablement system 104 may recognize the speech 114 as matching stored speech corresponding to a significant person, such as a voiceprint or other distinguishing voice characteristics. The system may access the stored speech via a database of one or more persons specified as significant person(s). Speaker recognition or other voice printing processes may be employed to identify the person speaking. For example the received speech signals of person 112 may be assessed for distinguishing voice characteristics that are compared to the stored speech characteristics of a known significant person.

In some implementations, with permission of the person 112, the user 102 may capture a sample of the speech of person 112 shortly before the conversation. For example, rather than using a previously stored full voice profile in a significant person database, a snippet of speech may be recorded on the fly during the interaction period with the person 112, such as at the start of the walk of user 102 with person 112. In some implementations, the sample speech may be transmitted by the wearable device to a remote storage space or stored on-board in a storage area of the wearable device. In the case of using sample speech recorded during an interaction period with the speaking person, a lower threshold of matching characteristics may suffice to identify the speaking person as a significant person to deactivate noise canceling, than a higher threshold of matching characteristics required when using speaker recognition using a full voice profile information previously stored in a database.

While on their walk, the user 102 and person 112 pass a couple of background persons 116, 118 talking with each other. The background persons 116, 118 are detected by the disablement system as being outside of the conversation zone of the user 102 when the user passes them. Accordingly, background person 116 speaking 120 fails to trigger disablement of noise canceling of the hearable device 106 of the user 102.

Figure 2:
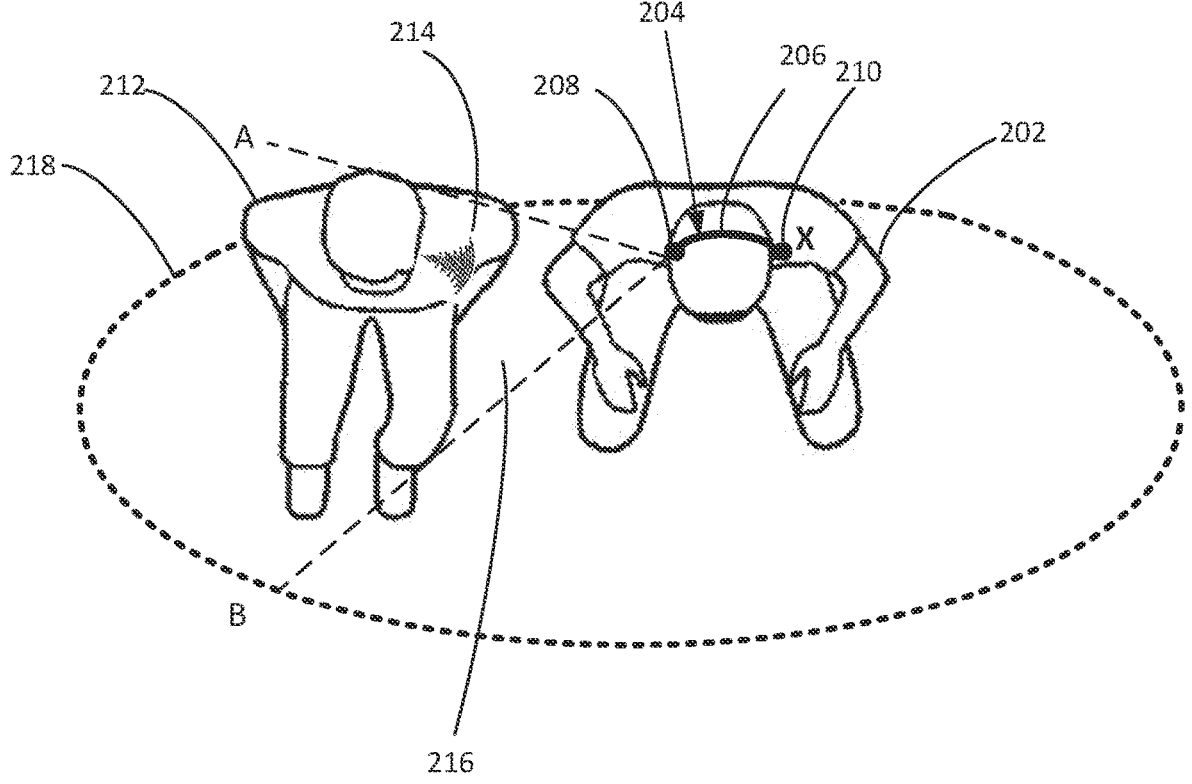
FIG. 2 is a conceptual diagram illustrating an example of the disablement system that disables noise canceling based on conversational speech of a person in a conversation zone, in accordance with some implementations.

FIG. 2 shows a tilted top down view of an example of the noise canceling disablement system 204 worn by a user 202 sitting in an environment 200 with a speaking person 212 sitting within a conversation zone 218 of the user 202. A hearable device 206 worn by the user 202 includes a right hearing unit 208 and left hearing unit 210.

The speech 214 of the speaking person 212 is detected by microphone(s) in the right hearing unit 208 to determine that the speaking person 212 is at a right side area 216 of the user 202, defined for illustration purposes by a space between dotted lines A and B. The conversation areas around the user (left side, right side, and front) may be variously sized depending at least in part on the hearable (e.g., microphone effectiveness, number, position, etc.), position of the hearable on the user, other hearable components, such as amplifier, etc. The conversation areas may be used to selectively adjust each hearing unit. However, in some implementations, the disablement system disables and enables noise canceling in both units at the same time without regard to conversation areas of the speaking person.

The direction of the speaking person may be determined within a space surrounding the user, such as left side area, right side area, front area. The direction of the speaking person 212 may be determined, for example by acoustic analysis of the speech signals received by the hearable device. For example, time of flight techniques may be employed to determine when sound arrives at the microphones at both the left hearing unit and the right hearing unit.

The resulting timing information may be interpreted, such as via a locus calculation, by each hearing unit providing timing information of the arrival time. For example, if one hearing unit has a shorter path than the other, that difference will indicate some combination of how off center the sound source (speaking person) is relative to the user. A radius area of the speaking person with respect to the user may be determined. For example, a short time of sound arrival typically correlates with a close distance to the user with in the conversation zone.

The conversation zone may include a space of at least 180 degrees, e.g., 180-200 degrees, from left hearing unit to right hearing unit including the front area of the user. The conversation zone may also be a narrower area in front of the user such as 90 degrees from the user front, left, or right side, where a narrower conversation band is needed. Often, the conversation zone excludes an area substantially behind the user, such as less than 360 degrees around the user, as the area directly behind the user may be difficult for the user to assimilate while wearing the hearable device. Normal acoustic effects available to a listener when not wearing a hearable may not be available to the user for sounds behind the user while wearing the hearable. For example, a listener may typically turn his/her head slightly to better hear that a sound is coming from behind for the ear to tell the difference between a sound (high frequency amplitude) from behind rather than from in front of the listener. The wearing of the hearable may distort these typical cues for the user.

In some implementations, the size, distance from the user, and/or shape of the conversation zone may be a predefined default space, or may be manually controlled by the user via user input, or may also be determined/adjusted automatically to suit a particular situation. For example, a conversation zone, such a radius including 3 feet from the user front, right and left sides may be used as a default conversation zone. The user may select an expanded zone or compressed zone by adjusting the default zone to meet the particular needs of the user. In some implementations, zone considerations may be employed for the disablement system to automatically vary a conversation zone. Such considerations may include a volume (loudness or softness) of background noise detected in the environment. For example, where the environment is loud and noisy, the conversation zone may be reduced in size, e.g., closer to the user, than a larger zone in a quieter environment, in order for the hearable to distinguish the conversational speech.

Various techniques may be employed to determine vicinity of the speaking person. For example, proximity detection via ultrasonic, radar, infrared (IR) may be used. In some implementations, combinations of additional techniques may be used in addition to or instead of acoustic time of flight used to localize direction.

Other configurations of the noise canceling disablement system 200 may be employed and are considered within the scope of this disclosure. For example, various designs and configurations of a hearable device may be used. The hearable may also be configured to pause or reduce volume of output of audio content while noise canceling is deactivated in one or both hearing units. In some implementations, in an audio playing multi-tasking mode, the system may deactivate noise canceling and audio content playing in one hearing unit and continue playing audio content in the other hearing unit. Such modes may be used, for example, if instructions are playing in one ear that can be used during interactions with the speaking person.

Figure 3:
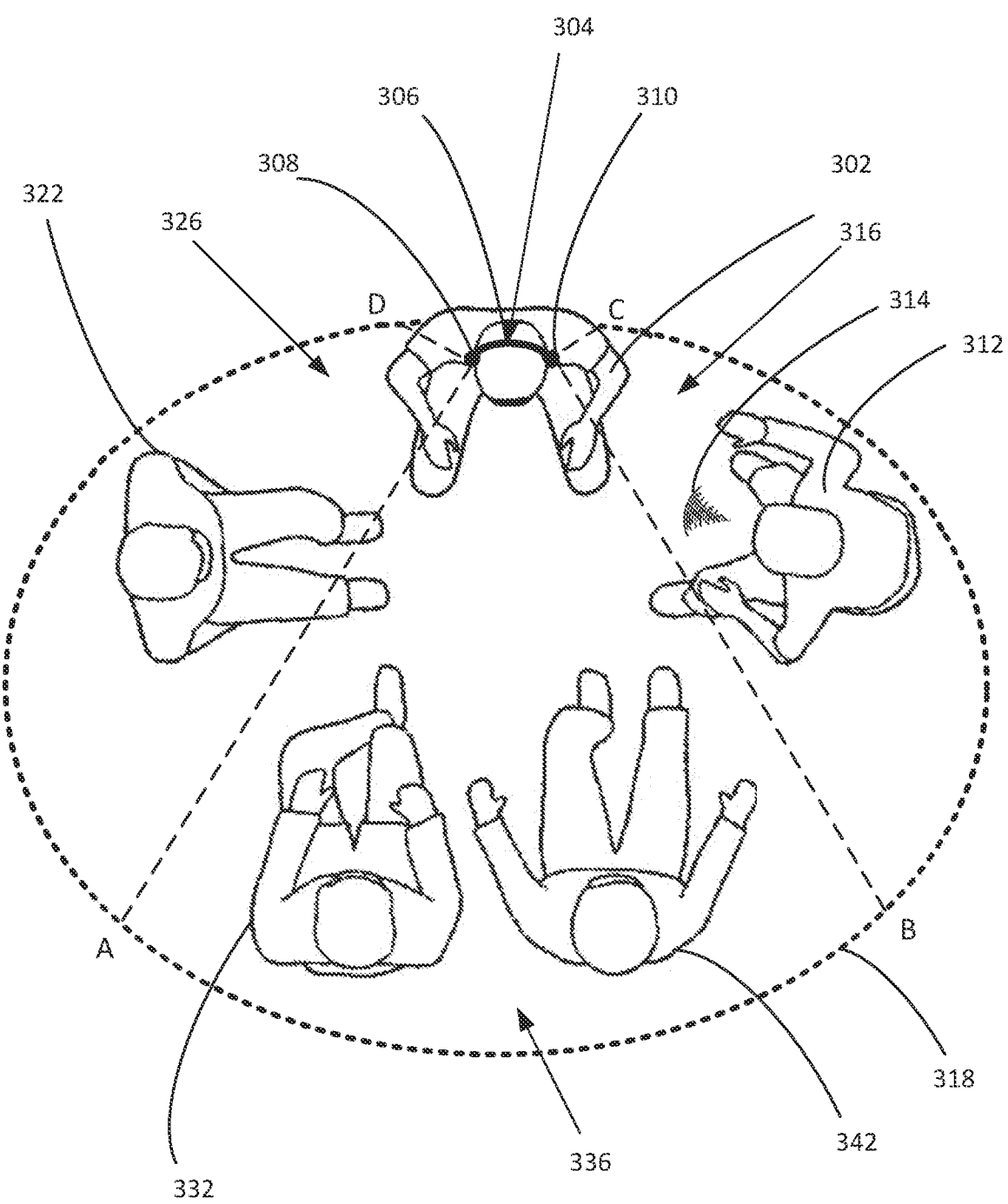
FIG. 3 a conceptual diagram illustrating an example of the disablement system that disables noise canceling based on conversational speech of multiple persons at different conversation areas of a conversation zone, in accordance with some implementations.

FIG. 3 shows a top down view of an example of the noise canceling disablement system 304 worn by a user 302 sitting in a group of other persons 312, 322, 332, and 342 in an environment 300 within a conversation zone 318 of the user 302. The hearable device 306 includes a left hearing unit 310 and right hearing unit 308.

In implementations where the disablement is configured for selective unit deactivation, e.g., multi-tasking mode, of noise canceling of the left hearing unit 310 may be deactivated by group person 312 speaking 314 in a left side area 316 defined within dotted lines B-C and right hearing unit 308 may maintain noise canceling. For example, group person 312 may be lecturing other members of the group, who are quietly listening. If group person 322 enters into the conversation by speaking at the right side area 326 of the user 312 in conversational zone 318 (such as asking a question to person 312), then opposite right hearing unit 308 may also deactivate noise canceling for the user to hear group person 322 speaking. If one or both of the front persons 332, 342 enters into the conversation by speaking in front conversation area 336, then both hearing units 308, 310 of the user may deactivate noise canceling.

In some implementations, when the speaking person 312 wanders outside of the conversation zone 318, a stopping event may be detected and the interaction period may end and deactivating of noise canceling also stops. Noise canceling may resume in the hearable and if audio content had been paused, the content may continue to play again.

In some implementations, the speaking person 312 may be tracked while speaking. Where the disablement system is configured for multi-tasking mode to deactivate one or more hearing units based on the conversation area of the speaking person, the disablement of units may also track the changed vicinity of the speaking person. For example, if speaking person 312 moves around the group from the left side area 316 of the user, to the front area 336 of the user, and then to the right area 326 of the user, all the while talking but still within the conversation zone 318, the disablement system 304 may accordingly deactivate the left hearing unit 310, then both units 308, 310 when that speaking person 312 is in the front area 336 of the user, and finally to the right side 326 deactivating the right hearing unit 308 (and the left unit 310 noise canceling may be reactivated) when the person is on the right side area 326 of the user. In this manner, the movement of the speaking person may be tracked within the conversation zone.

Figure 4:
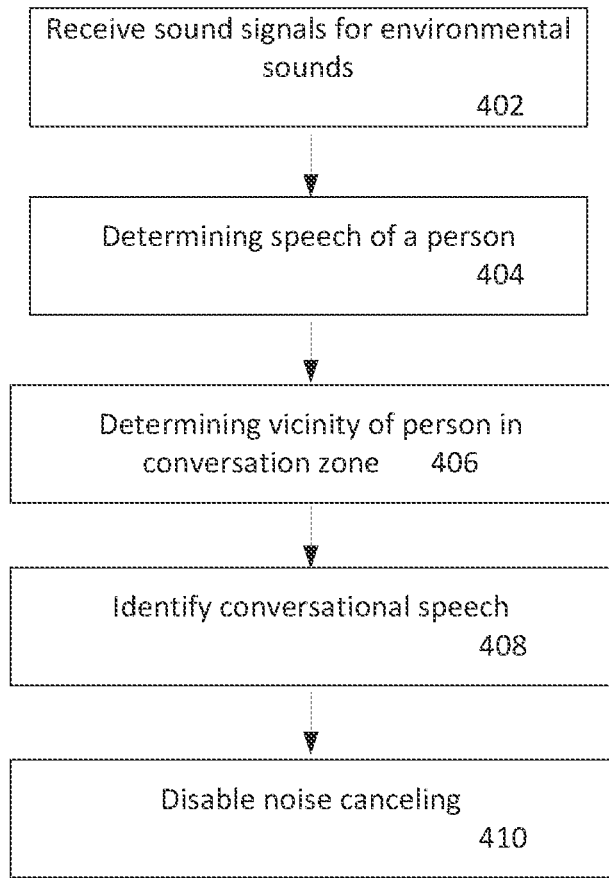
FIG. 4 is a flow diagram of an example method for disabling a noise canceling feature of a hearable device of a user, in accordance with some implementations.

FIG. 4 shows a flow chart of a noise canceling disablement process 400 in which a noise canceling feature of a hearable device of a user is adjusted by at least partial selective disablement. The process 400 is performed by disablement system 204 for example, as shown in FIG. 2.

In block 402, sound signals for environmental sounds are received by the hearable device. In block 406 speech of a person is detected within the sound signals of the environment.

In block 406, a vicinity of the speaking person is determined to be within a conversation zone of the user.

In block 408, the speech is identified as conversational speech that triggers disablement of the noise canceling feature in block 410.

FIG. 5 is a flow chart of methods to at least partially disable noise canceling of a hearable device of a user in which at least partial disablement can be performed on one or more hearing units depending on a conversation area of one or more speaking persons relative to the user. The process 500 is performed by disablement system 204 for example, as shown in FIG. 2.

In block 502, sound signals for environmental sounds are received by the hearable device. In block 504 speech of a particular person is detected within the sound signals of the environment.

In block 506, it is determined that the current person is speaking within a conversation zone of the user. Any speech or other sounds captured outside of the conversation zone are ignored in terms of disablement of the noise canceling feature.

In block 508, the disablement system makes a determination as to whether the speech is considered conversational speech to trigger the disablement, and in some configurations initiates an interaction period between the user and the speaking person. In some implementations, mere determining that someone is talking within the conversation zone is sufficient to identify the speech as conversational speech.

In other implementations, additional factors may need to be satisfied in order to identify the conversational speech that triggers disablement. For example, the person speaking within the conversation area may need to be identified as a significant person as well, using the recognition processes described above. Other factors may be whether a noise cancelation disablement mode has been turned on, turned off, or otherwise inactive for the wearable device, such as by user input, time of day, location of the user, or other prompts to start or stop the disablement process. In some implementations, the disablement process may commence and the user may override the disablement, such as where the user chooses not to listen to or engage with a speaking person. For example, the user may be listening to audio content that the user does not want to interrupt.

In block 510, the disablement system for example, in a multi-tasking mode, may determine a conversation area of the speaking person relative to the user with respect to the hearing units of the wearable device positioned at either ear of the user. The conversation area may be a portion of the conversation zone in which sound is most clearly captured by a specific one of the hearing units (right or left) or, in the case of a front conversation area, captured by both of the hearing units. As described above, the conversation area may be a left, right, or front area of the user.

In decision block 512, it is determined whether there is other speech to be assessed by another person in the received environmental sound signals. If there is additional speech, the process returns to block 506. If there is no more speech to assess, the process continues to block 514 to disable noise canceling feature of a particular one of the hearing units or both hearing units based on the conversation area of the speaking person.

In block 516, it is determined that the conversational speech has stopped in a manner that ends the interaction period with the speaking person, as described above. In block 518, noise canceling is no longer disabled and noise canceling may resume.

The methods of FIGS. 4 and 5 described herein can be performed via software, hardware, and combinations thereof. The process may be carried out in software, such as one or more steps of the process carried out by noise canceling disablement system. Although the description has been described with respect to particular implementations thereof, these particular implementations are merely illustrative, and not restrictive.

Figure 6:
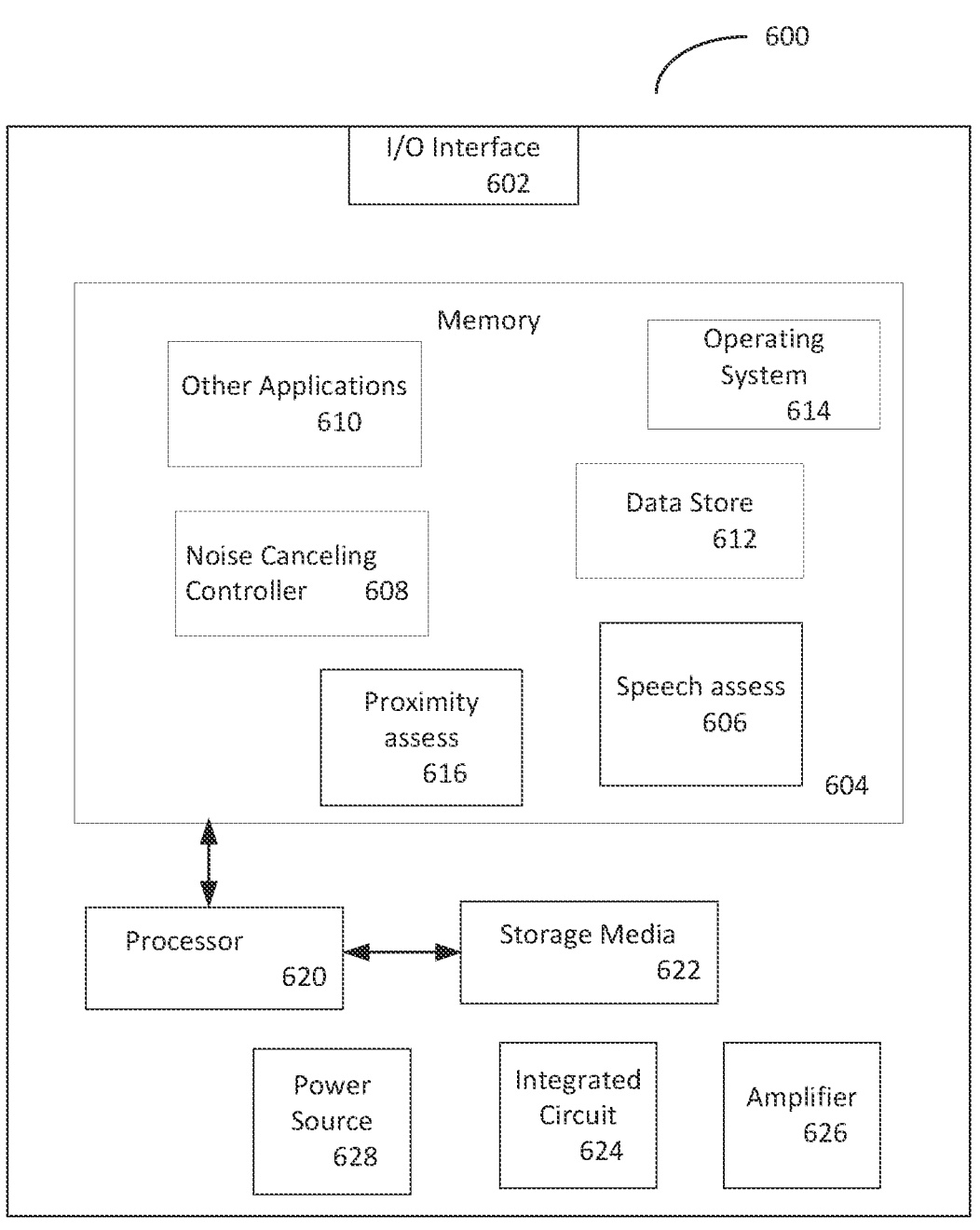
FIG. 6 is a block diagram of components of the disablement system usable to implement in the processes of FIGS. 4-5, in accordance with some implementations.

FIG. 6 is a block diagram illustrating an example functional electrical components of a hearable device 600 (also referred to as an apparatus) upon which aspects of the disablement system 204 described herein may be implemented. The hearable device 600 is merely illustrative and not intended to limit the scope of the claims. One of ordinary skill in the art would recognize other variations, modifications, and alternatives.

In the illustrated example, the hearable device 600 includes an I/O interface 602 (which may represent a combination of a variety of communication interfaces). In some implementations, interface 602 may communicate with a remote computing device to offload at least some of the disablement processes described in FIGS. 4-5, such as access stored speech, identification of a speaking person, etc. The interface 602 may also receive input from the user, such as user commands to operate aspects of the disablement system, e.g., turn on/off the disablement system, adjust the conversation zone, etc. In some implementations, one hearing unit may communicate through interface 602 to coordinate with another hearing unit in the pair of units of the hearable device.

The interface 602 may also be enabled for wireless communication, such as via BLUETOOTH, BLUETOOTH Low Energy (BLE), radio frequency identification (RFID), etc. Wireless communication by the hearable device may connect with other computing devices, such as a smart device of the user, e.g., smartphone, smart watch, etc.

In some implementations, hearable device 600 may also include software that enables communications of I/O interface 602 over a network such as HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like. The communication network may include a local area network, a wide area network, a wireless network, an Intranet, the Internet, a private network, a public network, a switched network, or any other suitable communication network, such as for example Cloud networks.

Other common hearable device components may be included, such as integrated circuit (IC) 624 and computer chip-embedded amplifier 626 to receive sound input and convert electrical signals from the microphones to digital signals. The IC 624 may include a digital-to-analog converter (DAC) or analog to digital converter (ADC). Power source 628 often includes disposable and/or rechargeable batteries.

Hearable device 600 typically includes additional familiar computer components such as a processor 620, and memory storage devices, such as a memory 604. A bus (not shown) may interconnect hearing aid components. While a computer is shown, it will be readily apparent to one of ordinary skill in the art that many other hardware and software configurations are suitable for use with the present invention.

Memory 604 may include solid state memory in the form of NAND flash memory and storage media 622. The computer device may include a microSD card for storage and/or may also interface with cloud storage server(s). Memory 604 and storage media 622 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 612 may be employed to store various on-board data, such as stored speech of significant persons, parameters that define a conversation zone, etc.

Hearable device 600 may include one or more computer programs, such as one or more software modules for speech assessment 606 and noise canceling controller 608 and various other applications 610 to perform operations described herein. The speech assessment module 606 performs analysis of received environmental sounds to determine speech, identify vicinity of a speaking person, and/or identify the speaking person as a significant person. The noise canceling controller 608 may control operations of the noise canceling feature of the hearable device according to the processes described herein.

Such computer programs, when executed by one or more processors, are operable to perform various tasks of methods including determine attention features in an environment and identifying attention requiring noises, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 604, storage device or memory on processor 620. A machine readable medium is any computer program product, apparatus or device used to provide machine instructions or data to a programmable processor.

Hearable device 600 further includes an operating system 614 to control and manage the hardware and software of the computer device 600. Any operating system 614, e.g., mobile OS, that is supports the noise cancelation and disablement methods may be employed, e.g., IOS, Android, Windows, MacOS, Chrome, Linux, etc.

Although the description of the disablement system has been described with respect to particular embodiments thereof, these particular embodiments are merely illustrative, and not restrictive.

Any suitable programming language can be used to implement the routines of particular embodiments including IOS, Objective C, Swift, Java, Cotlin, C, C++, C#, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for adjusting a noise canceling feature of a hearable device of a user, the method performed, comprising:

providing a first noise canceling feature of a first hearing unit of the hearable device and a second noise canceling feature of a second hearing unit of the hearable device;

during an interaction period, receiving by one or more microphones of the hearable device, sound signals for at least one sound detected from an environment of the user, determining that the at least one sound includes first speech by a first person;

defining a conversation zone of the user based, at least in part, on a volume level of ambient noise detected in the environment;

determining that the first person is within a first side area of the conversation zone;

in response, at least in part, to determining the first person is within the first side area of the conversation zone, at least partially disabling the first noise canceling feature of the first hearing unit of the hearable device that correlates with the first side area and maintaining the second noise canceling feature of the second hearing unit;

tracking that the first person moves to a second side area of the conversation zone during the interaction period; and in response to detecting the first person speaks at the second side area, disabling the second noise canceling feature of the second hearing unit that correlates with the second side area and resuming the first noise canceling feature of the first hearing unit.

2. The method of claim 1, further comprising:

identifying that the first person is a significant person based on analyzing the first speech, wherein at least partially disabling of the first noise canceling feature is further in response to identifying the first person as a significant person.

3. The method of claim 2, wherein identifying the first person as a significant person includes using speaker recognition of the first speech to compare the first speech to stored speech of one or more significant persons.

4. The method of claim 3, further comprising:

prior to determining the first person is within a conversation zone, recording sample speech of the significant person, during the interaction period with the significant person; and storing the sample speech to use as the stored speech in comparing the first speech.

5. The method of claim 1, further comprising:

subsequent to detecting the first person speaking at the second side area and resuming the first noise canceling feature, detecting that the at least one sound includes a second speech of a second person speaking at the first side area of the conversation zone; and disabling the first noise canceling feature of the first hearing unit that correlates with the first side area.

6. The method of claim 1, further comprising:

detecting that the first person leaves the second side area of the conversation zone to end the interaction period; and in response to detecting the first person leaving, resuming the second noise canceling feature of the hearable device.

7. The method of claim 1, wherein defining the conversation zone includes varying a distance from the user, size, and/or shape of a predefined conversation zone.

8. An apparatus of a noise canceling disablement system, the apparatus comprising:

a hearable device of a user having a first hearing unit with a first noise canceling feature and having a second hearing unit with a second noise canceling feature, the hearable device further comprising:

one or more processors; and logic encoded in one or more non-transitory media for execution by the one or more processors and when executed operable to perform operations comprising:

during an interaction period, receiving by one or more microphones of the hearable device, sound signals for at least one sound detected from an environment of the user, determining that the at least one sound includes a first speech by a first person;

defining a conversation zone based, at least in part, on a volume level of ambient noise detected in the environment;

determining that the first person is within a first side area of the conversation zone;

in response, at least in part, to determining that the first person is within the first side area of the conversation zone, at least partially disabling the first noise canceling feature of the first hearing unit of the hearable device that correlates with the first side area and maintaining the second noise canceling feature of the second hearing unit; and in response, at least in part, to determining that the first person is within the first side area of the conversation zone, at least partially disabling the noise canceling feature of the first hearing unit of the hearable device that correlates with the first side area and maintaining the second noise canceling feature of the second hearing unit;

subsequent to detecting the first person in the first side area, detecting that the at least one sound includes a second speech of a second person speaking at a second side area of the conversation zone; and disabling the second noise canceling feature of the second hearing unit that correlates with the second side area.

9. The apparatus of claim 8, wherein the operations further comprise:

detecting that the first person leaves the conversation zone to end the interaction period; and in response to detecting the first person leaving, resuming the first noise canceling feature of the first hearing unit of the hearable device.

10. The apparatus of claim 8, wherein the operations further comprise:

identifying that the first person is a significant person based on analyzing the first speech, wherein at least partially disabling of the first noise canceling feature is further in response to identifying the first person as a significant person.

11. The apparatus of claim 8, wherein defining the conversation zone includes varying a distance from the user, size, and/or shape of a predefined conversation zone.

12. A non-transitory computer-readable storage medium carrying program instructions thereon for adjusting a first noise canceling feature of a first hearing unit of a hearable device and a second noise canceling feature of a second hearing unit of the hearable device used by a user, the instructions when executed by one or more processors cause the one or more processors to perform operations comprising:

during an interaction period, receiving by one or more microphones of the hearable device, sound signals for at least one sound detected from an environment of the user, determining that the at least one sound includes a first speech by a first person;

defining a conversation zone based, at least in part, on a volume level of ambient noise detected in the environment;

determining that the first person is within a first side area of the conversation zone;

in response, at least in part, to determining that the first person is within the first side area of the conversation zone, at least partially disabling the first noise canceling feature of the first hearing unit of the hearable device that correlates with the first side area and maintaining the second noise canceling feature of the second hearing unit;

tracking that the first person moves to a second side area of the conversation zone during the interaction period; and in response to detecting the first person speaks at the second side area, disabling the second noise canceling feature of the second hearing unit that correlates with the second side area and resuming the first noise canceling feature of the first hearing unit.

13. The non-transitory computer-readable storage medium of claim 12, wherein the operations further comprise:

detecting that the first person leaves the second side area of the conversation zone to end the interaction period; and in response to detecting the first person leaving, resuming the second noise canceling feature of the second hearing unit of the hearable device.

14. The non-transitory computer-readable storage medium of claim 12, wherein the operations further comprise:

subsequent to detecting the first person speaking at the second side area and resuming the first noise canceling feature, detecting that the at least one sound includes a second speech of a second person speaking at the first side area of the conversation zone; and disabling the first noise canceling feature of the first hearing unit that correlates with the first side area.

15. The non-transitory computer-readable storage medium of claim 12, wherein the operations further comprise:

identifying that the first person is a significant person based on analyzing the first speech, wherein at least partially disabling of the first noise canceling feature is further in response to identifying the first person as a significant.

16. The non-transitory computer-readable storage medium of claim 12, wherein defining the conversation zone includes varying a distance from the user, size, and/or shape of a predefined conversation zone.

* * * * *